United States Patent

Prentice

[15] 3,650,866

[45] Mar. 21, 1972

[54] INCREASING STRIP TENSILE STRENGTH OF MELT BLOWN NONWOVEN POLYPROPYLENE MATS OF HIGH TEAR RESISTANCE

[72] Inventor: James S. Prentice, Baytown, Tex.

[73] Assignee: Esso Research and Engineering Company

[22] Filed: Oct. 9, 1969

[21] Appl. No.: 865,108

[52] U.S. Cl.............................156/181, 156/161, 156/167, 156/290, 156/306
[51] Int. Cl.......................................................B32b 31/00
[58] Field of Search................156/161, 167, 181, 229, 290, 156/306

[56] References Cited

UNITED STATES PATENTS 3,276,944  10/1966  Levy...................................156/306 X
3,436,298  4/1969  Oppenlander et al..............156/181 X
3,442,740  5/1969  David....................................156/181

*Primary Examiner*—Carl D. Quarforth
*Assistant Examiner*—R. L. Tate
*Attorney*—Thomas B. McCulloch, Melvin F. Fincke, John S. Schneider, Sylvester W. Brock, Jr., Kurt S. Myers and Timothy L. Burgess

[57] ABSTRACT

The strip tensile strength of a highly tear resistant nonwoven mat of melt blown polypropylene fibers having a diameter between about 10–40 microns is increased, while maintaining a high mat tear resistance, by fuse-bonding, as by calendering or point-bonding, at least a portion of the fibers of the mat at temperatures not greater than about 225° F., preferably, between about 170°–210° F., under pressure sufficient to prevent shrinkage of the fibers of the mat.

4 Claims, 4 Drawing Figures

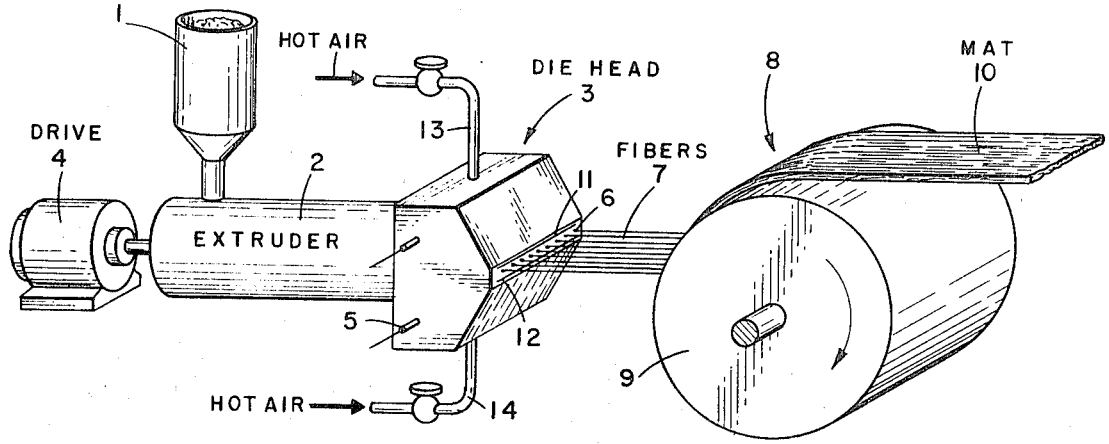
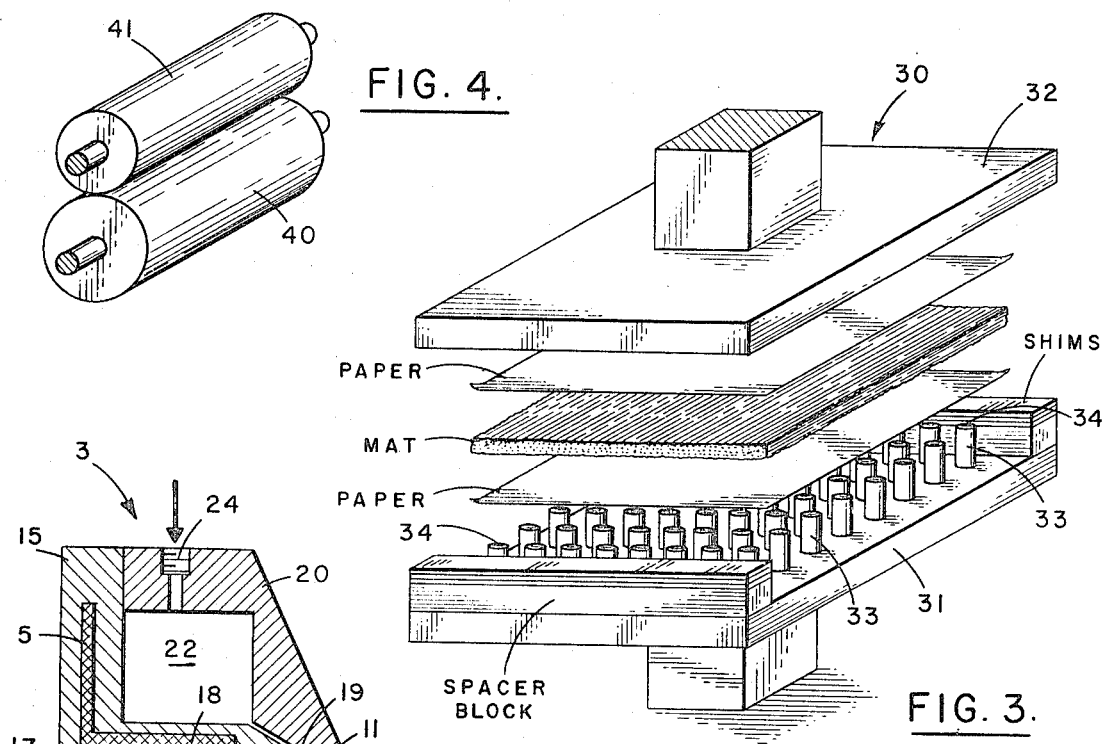

INCREASING STRIP TENSILE STRENGTH OF MELT BLOWN NONWOVEN POLYPROPYLENE MATS OF HIGH TEAR RESISTANCE

BACKGROUND OF THE INVENTION

1. Field of the Invention

The present invention is directed to a process for increasing the strip tensile strength of highly tear resistant melt blown nonwoven mats of polypropylene fibers having a diameter between about 10-40 microns while maintaining a high mat tear resistance.

2. Prior Art

U.S. Pat. No. 3,276,944.

SUMMARY OF THE INVENTION

In this invention, an increase of up to 1,000 m. or greater in the strip tensile strength of a melt blown nonwoven polypropylene mat having a tear resistance of at least about 1,000 dm.$^2$ is obtained, while maintaining the tear resistance to at least 1,000 dm.$^2$, by fuse-bonding, at temperatures no higher than about 225° F., at least a portion of the polypropylene fibers making up the mat, under sufficient pressure to prevent shrinkage of those fibers.

BRIEF DESCRIPTION OF THE DRAWINGS

FIG. 1 is a schematic perspective view of the overall melt blowing process;

FIG. 2 is a detailed view in longitudinal cross section of a die which may be used in the melt blowing process;

FIG. 3 is a schematic view of a press used to increase the strip tensile strength of a highly tear resistant melt blown nonwoven mat; and FIG. 4 is a schematic view of calender rolls which may be used instead of the press of FIG. 3.

DESCRIPTION OF THE PREFERRED EMBODIMENTS

Referring to FIG. 1 of the drawings, polypropylene resin is introduced into a pellet hopper 1 of an extruder 2. The polypropylene resin is forced through the extruder 2 into a die head 3 by a drive 4. The die head 3 may contain heating plates 5 which may control the temperature in the die head 3. The resin is then forced out of a row of die openings 6 in the die head 3 into a gas stream which attenuates the resin into fibers 7 which are collected on a moving collecting device 8 such as a drum 9 to form a continuous mat 10. The gas stream which attenuates the resin is supplied through gas jets 11 and 12 respectively, which are more clearly seen in FIG. 2. The gas slots 11 and 12 are supplied with a hot gas, preferably air, by gas lines 13 and 14 respectively.

The process may be further understood by reference to the details of the die head 3, as more fully depicted in FIG. 2. The die head 3 is formed of upper die plate 15 and lower die plate 16. The resin is introduced in the back of the die plates 15 and 16 through an inlet 17 as a result of the forcing action of extruder 2 at the back of the die plate 3. The resin then goes into a chamber 18 between the upper and lower die plates 15 and 16 respectively. The facing of the die plates 16 may have milled grooves 19 which terminate in the die openings 6. It is understood, of course, that the milled grooves may be in the lower die plate 16 or the upper die plate 15, or that grooves may be milled in both plates 15 and 16. Still further, if a single plate is used in place of the upper and lower die plates, the grooves may be drilled to produce the die openings 6. An upper gas cover plate 20 and a lower gas cover plate 21 are connected to the upper die plate and lower die plate 15 and 16 respectively to provide an upper air chamber 22 and a lower air chamber 23 which terminate in the gas slots 11 and 12 respectively. The hot gas is supplied through inlet 24 and upper gas cover plate 20 and inlet 25 and lower gas cover plate 21. Suitable baffling means (not shown) may be provided in both the upper air chamber 22 and the lower air chamber 23 to provide a uniform flow of air through the gas slots 11 and 12 respectively. The die head 3 may contain heating means 5 for heating both the resin and air in the die head 3.

The particular operating conditions employed in the melt blowing process control the characteristics of the polypropylene mats produced by the process. The characteristics of the nonwoven polypropylene mats are affected in large part by the air flow rates used in the melt blowing process and the distance of the takeup device from the die openings in the die head. In the melt blowing process, when the air rates are low relative to the rate of polymer flow through the die openings, so that a pounds of air/pounds of polymer ratio of between about 25-60, preferably between about 30 and about 50, occurs, the extruded resin is attenuated by the air into fibers having diameters between about 10-40 microns, usually between about 15 to 25 microns. Melt blown nonwoven mats with a tear resistance of at least 1,000 dm.$^2$ are produced if the polypropylene fibers of that diameter are collected at a distance of at least about 12 inches, and desirably, no more than about 30 inches, from the die openings. At die-collector-distances of 12 or more inches, the fibers of the melt blown nonwoven polypropylene mat are bound together essentially by entanglement, with little or no self-bonding, any self-bonding decreasing with increasing die-collector-distances. The term "self-bonding" herein means thermal bonding of one fiber to another as the nonwoven polypropylene mats are formed.

While the melt blown nonwoven polypropylene mats prepared under these conditions have tear resistances of at least 1,000 dm.$^2$, as measured by a standard Elmendorf tear strength tester, in accordance with ASTM procedure D-689-2, the strip tensile strength of these highly tear resistance nonwoven polypropylene mats will rarely exceed 700 m., as measured by ASTM procedure D-828-60 using a standard Instron tester. Tear resistances are reported in square decimeters (dm.$^2$), the unit resulting when the force necessary to tear a sample of the mat, measured in grams, is multiplied by a factor of 100 and divided by the basis weight of the sample, expressed as gm./m.$^2$ Strip tensile strengths are reported in meters (m.), the unit resulting when the force necessary to break the mat, measured in grams, is divided by the width of the sample, measured in meters, all of which is divided by the basis weight of the sample in terms of gm./m.$^2$ In accordance with this invention, the strip tensile strength of these highly tear resistant, melt blown nonwoven mats of polypropylene fibers is increased, while maintaining the high tear resistance of the mat above at least 1,000 dm.$^2$, by fuse-bonding the nonwoven mat at temperatures which do not exceed 225° F. while compressing the mat sufficiently to prevent shrinkage of the fibers in the mat.

The fuse-bonding process may be accomplished by applying a spaced pattern of heat to the mat to melt discrete portions of the mat and to fuse a portion of the fibers in the mat. Alternatively, the fuse-bonding may be effected by application of an overall pattern of heat to the mat so that fusion of fibers in the mat is more diffuse and less discrete. In the fuse-bonding process, application of sufficient pressure to prevent shrinkage of the fibers in the nonwoven mat is indicated by lack of a difference in the size of the mat before and after fuse-bonding and by a lack of decrease in the zero span tensile strength of the untreated mat. The procedure for obtaining zero span tensile strength is the same as that for obtaining strip tensile strength, with the exception that to measure the strip tensile strength, the clamps are set apart a distance of 2 inches, using an elongation rate of 250 percent/minute, but to measure the zero span tensile strength the clamps are not separated by any distance. In both instances, the results are reported in meters.

Referring to FIG. 3, a heated press 30 may be used in the fuse-bonding process to increase the strip tensile strengths of the melt blown nonwoven polypropylene mats having high tear resistance. The press 30 comprises a plate 31 and a plate 32. The plate 31 has a plurality of spaced apart projections 33 which terminate in flat lands 34 that are spaced in a design or pattern. The spacing of the projections 33, the total surface of the flat lands 34 and the pattern of the projections 33 of the plate 31 will partially determine the degree to which the fibers of the nonwoven mats are point-bonded. The spacing of the projections 33 and the pattern may vary greatly although suitable patterns are rectilinear or diagonal grids. Suitable spacing for the projections 33 are between about one-sixteenth and one-fourth inch. The plate 32 may have a flat surface which would come in contact with the lands 34 of the projections 33 of plate 31 or the plate 32 may also have projections which are aligned with the projections of plate 31 so that the lands of the projections of plate 32 would contact the lands 34 of the projections of plate 31. The depth to which the projections 33 will penetrate the nonwoven sheet may be controlled by the use of spacers or shims placed between plate 31 and plate 32. The shims are positioned so that the projections 33 do not contact the flat surface of plate 32 but are spaced therefrom by the height of the shim. To obtain the greater strip tensile strengths of the nonwoven mats, the deeper penetration of the projections 33 into the nonwoven mats is used. Each of the plates 31 and 32 may be heated independently so that the temperatures of the plates are not necessarily the same.

In the fuse-bonding process of the nonwoven mats, it is convenient to use spacer sheets between the nonwoven mats and plates 31 and 32 of the press to prevent the nonwoven mat from sticking to the plates either during or subsequent to the fuse-bonding operation. Suitable spacer sheet material which may be employed include insulating materials such as tissue paper, ordinary paper and the like or heat conducting materials such as aluminum foil and the like. The conducting spacer sheets are preferably used only at fusing temperatures below about 200° F., since they conduct heat to the areas of the mat between the lands 34 and increase the fusing of the fibers in those areas in addition to the point-bonded areas.

For the continuous production of highly tear resistant melt blown nonwoven polypropylene mats of improved strip tensile strengths, it is advantageous to carry out the fuse-bonding process by calendering the nonwoven mats under heating conditions which effect fiber-to-fiber fusion under pressure sufficient to prevent shrinkage of the fibers of the mat. Referring to FIG. 4, calender rolls 40 and 41 are shown which may be employed instead of the press 30. The calender rolls may both be smooth, as shown, or one roll may have projections which terminate in flat lands, just as the press plates, and may be patterned in a wide variety of forms, such as a diagonal grid (not shown). The rolls may be operated at different temperatures by heating the rolls independently of the other. In the calendering operation to carry out the fuse-bonding, spacer sheets may also be used to prevent the nonwoven mats from sticking to the calender rolls. The preferred method of effecting fuse-bonding is by calendering.

The fuse-bonding process is further illustrated by the specific examples which follow hereinafter. In these examples, highly tear resistant nonwoven mats of melt blown polypropylene fibers were treated, in accordance with this invention, to improve the strip tensile strength of the mats. The mats which were so treated were prepared by the melt blowing process which was illustrated in FIGS. 1 and 2 of the drawings, using the specific operation conditions set forth in Table I, which follows.

TABLE I

| Mat No. | A | B | C | D | E | F | G | H | I |
|---|---|---|---|---|---|---|---|---|---|
| Polypropylene MFR | 33 | 33 | 33 | 33 | 33 | 33 | 33 | 33 | 33 |
| Extruder temp. (° F.) | 580 | 585 | 600 | 600 | 600 | 598 | 600 | 600 | 600 |
| Die Temp. (° F.) | 533 | 525 | 560 | 567 | 563 | 560 | 553 | 553 | 559 |
| Polymer rate (gm./min.) | 8.0 | 8.5 | 20 | 21 | 21 | 21 | 21 | 21 | 21 |
| Air flow (lb./min.) | .67 | 0.82 | 1.4 | 1.4 | 1.4 | 1.4 | 0.9 | 0.9 | 0.9 |
| lb. air/lb. polymer | 38 | 44 | 32 | 30 | 30 | 30 | 20 | 20 | 20 |
| Die-collector distance (in.) | 18 | 12 | 18 | 18 | 18 | 18 | 18 | 18 | 20 |

EXAMPLES 1-3

Samples of three of the highly tear resistant nonwoven mats of melt blown polypropylene fibers prepared by the conditions set out in Table I were calendered at the incrementally increased temperatures indicated in Table II. The calender roll pressure in each case was 700 pounds per linear inch, and the line speed of the calender rolls in each case was 20 ft./min.

TABLE II

| Example No. | Mat No. | Tensile (m.) | Tear (dm.$^2$) | Calender roll temp. (° F.) Upper | Lower |
|---|---|---|---|---|---|
| 1 | A | 858 | 1,844 | 171 | 145 |
|   |   | 1,031 | 1,882 | 200 | 165 |
|   |   | 1,441 | 1,643 | 225 | 189 |
|   |   | 1,941 | 152 | 250 | 215 |
| 2 | B | 584 | 1,304 | 70 | 70 |
|   |   | 692 | 1,303 | 100 | 85 |
|   |   | 685 | 1,592 | 125 | 47 |
|   |   | 688 | 1,170 | 150 | 114 |
|   |   | 744 | 1,000 | 175 | 130 |
|   |   | 819 | 1,010 | 200 | 147 |
|   |   | 1,020 | 252 | 225 | 165 |
|   |   | 1,335 | 91 | 250 | 185 |
|   |   | 1,489 | 42 | 275 | 205 |
| 3 | C | 692 | 1,566 | 70 | 70 |
|   |   | 1,129 | 1,915 | 200 | 140 |
|   |   | 1,124 | 1,808 | 206 | 187 |
|   |   | 1,207 | 1,033 | 210 | 150 |
|   |   | 1,463 | 957 | 220 | 160 |
|   |   | 1,628 | 254 | 230 | 168 |
|   |   | 1,754 | 107 | 240 | 175 |

As illustrated by Table II, the strip tensile strengths of the highly tear resistant nonwoven mats of polypropylene fibers were increased while maintaining the tear resistance of the mats at levels greater than about 1,000 dm.$^2$ by calendering the mats at temperatures which did not exceed about 200°-225° F., depending upon the initial tear resistance of the particular mat involved. For example, Mat A, which had higher tear resistance at 170°-200° F. than the tear resistances of Mats B and C at those temperatures, retained a high tear resistance even at 225° F., but above about 225° F., its tear resistance dropped precipitously to an extremely low level. In each example, the tensile strengths of the mats increased with an increase of calender roll temperature, up to the maximum temperature past which the tear resistance of the mat, in every case, fell steeply from the level of about 1,000 dm.$^2$ and above. The high tear resistance and the moderate tensile strengths of the treated nonwoven mats are properties which make the present nonwoven mats well suited for bagging material, for example, for forming into grocery bags.

EXAMPLES 4-9

In these examples, the melt blown nonwoven mats D-I of Table I were fuse-bonded as in Examples 1-3, except that the temperature of the calender rolls in each instances was 198° F. for the upper roll and 173° F. for the lower roll.

TABLE III

| Example No. | Mat No. | Tensile (m.) | Tear (dm.$^2$) | Calender roll temp. (° F.) Upper | Lower |
|---|---|---|---|---|---|
| 4 | D | 970 | 2,000 | 198 | 173 |
| 5 | E | 880 | 1,880 | 198 | 173 |
| 6 | F | 875 | 2,900 | 198 | 173 |
| 7 | G | 1,000 | 2,200 | 198 | 173 |
| 8 | H | 1,000 | 3,000 | 198 | 173 |
| 9 | I | 1,000 | 2,200 | 198 | 173 |

As illustrated by Table III, the strip tensile strength of each mat was substantially increased to 1,000 m. for Examples 7-9, while the tear resistance of each mat was maintained at very high levels exceeding 1,000 dm.$^2$, by the fuse-bonding treatment of this invention.

Manifestly, the high tear resistance of the present melt blown nonwoven polypropylene mats and the low to moderate tensile strengths which can be imparted to them by the process of this invention make these mats useful for many and diverse applications, such as bags, fabric backings and other liners, clothing components, synthetic paper, wrapping materials, components for laminates, and the like.

Having fully and particularly described the present invention and having set forth the best modes for accomplishing the purpose thereof, it with now be apparent that alterations and variations of the same process may be made within the spirit and scope of the invention, as defined by the appended claims.

I claim:

1. A process for increasing the strip tensile strength of a melt blown nonwoven mat of polypropylene fibers having a diameter between about 10–40 microns, said nonwoven mat having a tear resistance greater than 1,000 dm.$^2$ comprising:

fuse-bonding at least a portion of said fibers at a temperature no greater than about 225° F. under pressures sufficient to prevent shrinkage of the fibers, whereby the strip tensile strength of said mat is increased and the tear resistance of said mat is maintained greater than about 1,000 dm.$^2$ 2. The process of claim 2 wherein said temperature is between about 170°–225° F.

3. The process of claim 1 in which said fuse-bonding is by calendering.

4. The process of claim 1 in which said fuse-bonding is by point-bonding.

* * * * *